(12) United States Patent
Manicke et al.

(10) Patent No.: US 11,823,885 B2
(45) Date of Patent: Nov. 21, 2023

(54) PRESSURE SENSITIVE ADHESIVE COATED PAPER FOR PAPER SPRAY MASS SPECTROMETRY

(71) Applicants: THE TRUSTEES OF INDIANA UNIVERSITY, Bloomington, IN (US); THE U.S. GOVERNMENT AS REPRESENTED BY THE U.S. ARMY COMBAT CAPABILITIES DEVELOPMENT COMMAND, Aberdeen Proving Ground, MD (US)

(72) Inventors: Nicholas Edward Manicke, Zionsville, IN (US); William Raymond Anthony Wichert, Bloomingdale, NJ (US); Ethan M. McBride, Aberdeen Proving Ground, MD (US); Trevor G. Glaros, Aberdeen Proving Ground, MD (US); Phillip M. Mach, Aberdeen Proving Ground, MD (US)

(73) Assignees: The Trustees of Indiana University, Bloomington, IN (US); The U.S. Government as Represented by the U.S. Army Combat Capabilities Development Command, Aberdeen Proving Ground, MD (US)

(*) Notice: Subject to any disclaimer, the term of this patent is extended or adjusted under 35 U.S.C. 154(b) by 0 days.

(21) Appl. No.: 17/782,676

(22) PCT Filed: Dec. 18, 2020

(86) PCT No.: PCT/US2020/065820
§ 371 (c)(1),
(2) Date: Jun. 6, 2022

(87) PCT Pub. No.: WO2021/127321
PCT Pub. Date: Jun. 24, 2021

(65) Prior Publication Data
US 2023/0021976 A1 Jan. 26, 2023

Related U.S. Application Data

(60) Provisional application No. 62/951,515, filed on Dec. 20, 2019.

(51) Int. Cl.
*H01J 49/00* (2006.01)
*H01J 49/04* (2006.01)

(52) U.S. Cl.
CPC ...... *H01J 49/0445* (2013.01); *H01J 49/0022* (2013.01)

(58) Field of Classification Search
CPC .......................... H01J 49/0445; H01J 49/0022
(Continued)

(56) References Cited

U.S. PATENT DOCUMENTS

| 11,125,738 B2 * | 9/2021 | Glazier ............... H01J 49/0036 |
| 2015/0325423 A1 | 11/2015 | Ouyang et al. |
| 2018/0012746 A1 | 1/2018 | Ouyang et al. |

FOREIGN PATENT DOCUMENTS

WO 2015/188282 A1 12/2015

OTHER PUBLICATIONS

PCT International Search Report and Written Opinion completed by the ISA/US dated Feb. 26, 2021 and issued in connection with PCT/US2020/065820.

\* cited by examiner

*Primary Examiner* — Nicole M Ippolito
(74) *Attorney, Agent, or Firm* — Barnes & Thornburg LLP

(57) ABSTRACT

A method for analyzing a sample collected from a surface, the method comprising placing at least a portion of a
(Continued)

substrate having a pressure sensitive adhesive layer containing the sample in a holder, adding a spray solvent to the sample-containing pressure sensitive adhesive layer, and analyzing the sample contained in the pressure sensitive adhesive layer and the spray solvent using paper spray mass spectrometry.

20 Claims, 3 Drawing Sheets

(58) Field of Classification Search
USPC .................................... 250/281, 282, 288
See application file for complete search history.

200
PRESSURE SENSITIVE ADHESIVE COATED PAPER FOR PAPER SPRAY MASS SPECTROMETRY

RELATED APPLICATION

This application is a U.S. national counterpart application of international application serial No. PCT/US2020/065820 filed Dec. 18, 2020, which claims the benefit of U.S. Provisional Patent Application No. 62/951,515, filed Dec. 20, 2019, the entire disclosures of which are hereby incorporated by reference in their entireties.

FIELD OF THE DISCLOSURE

The present disclosure relates generally to a method for detecting contaminants on a surface using a pressure sensitive adhesive (PSA) coated paper and paper spray mass spectrometry.

BACKGROUND OF THE DISCLOSURE

Numerous fields require detection of trace residues or small particles from surface. Example resides or small particles include trace explosives residue, organic gunshot residue, and controlled substances. In addition, the abuse of drugs represents a multi-faceted problem concomitant with a wide variety of drug classes, including prescription drugs, illicitly manufactured drugs, and those derived from plants and other organic material. Detecting these chemistries, especially from porous absorbent surfaces, has been a challenge of previously used detection methods. Thus, a detection system and method is needed that provides improved detection of these chemistries, especially from absorbent surfaces.

SUMMARY OF THE DISCLOSURE

In one embodiment of the present disclosure, a method for analyzing a sample collected from a surface is provided. The method comprises providing a substrate having a pressure sensitive adhesive layer containing the sample, adding a spray solvent to the sample-containing pressure sensitive adhesive layer, and analyzing the sample contained in the pressure sensitive adhesive layer and the spray solvent using paper spray mass spectrometry.

In another embodiment of the present disclosure, a sample collecting substrate is provided. The sample collecting substrate comprises a body, a tip coupled to the body, and a pressure sensitive adhesive layer adhered to at least a portion of the body, wherein the sample collecting substrate is configured to be analyzed via spray paper mass spectrometry.

In yet another embodiment of the present disclosure, a holder configured to support a sample collecting substrate is provided. The holder comprises a body having a first opening configured to receive the sample collecting substrate, a second opening configured to receive a spray solvent to be applied to the sample collecting substrate, and a third opening configured to receive a wire for providing a high voltage during paper spray mass spectrometry analysis of the sample collecting substrate.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings.

Figure 1:
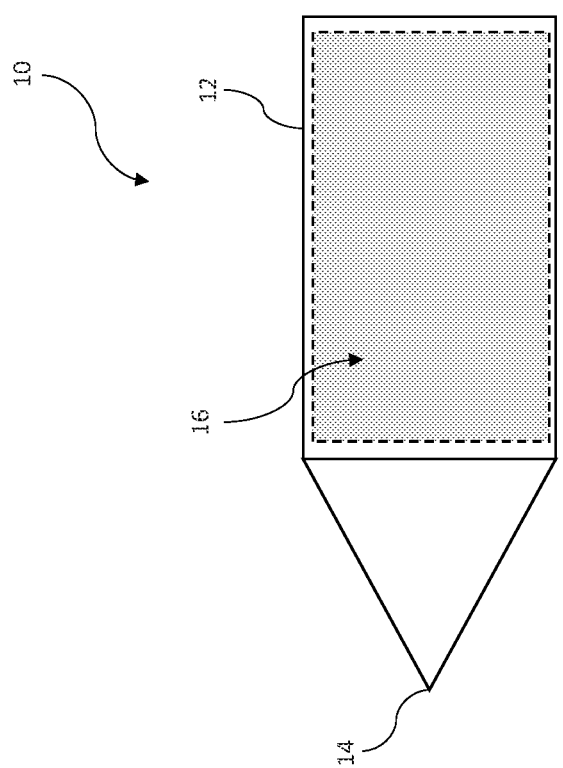
FIG. 1 shows a schematic view of a pressure sensitive adhesive (PSA) coated substrate of the present disclosure.

Referring to FIG. 1, a schematic of a pressure sensitive adhesive (PSA) coated substrate 10 of the present disclosure is shown. PSA coated substrate 10 generally includes a body 12 and a tip 14. In various embodiments, body 12 and tip 14 are formed of various forms of paper, such as recycled paper, ruggedized outdoor paper and/or office paper, for example, or other various types of materials capable of receiving a PSA coating on a surface thereof. Body 12 includes a layer of PSA coating 16 over a portion or all of at least one surface of body 12. PSA coating 16 may include permanent and/or reusable or releasable PSAs including, but not limited to acrylic-based elastomers with or without added tackifiers.

Tip 14 extends from body 12, and is generally triangular shaped. In various embodiments, PSA coating 16 may extend onto tip 14. By holding tip 14, PSA coated paper 10, specifically PSA coating 16, may be placed in contact with a surface of varying materials, including but not limited to paper, cloth (such as clothing, upholstery, luggage, etc.), skin, wood, cardboard, plastic, etc., to collect a sample, which may include contaminates and/or other particles located on the contacted surface. The contaminates collected may include illegal drugs, for example, acetyl fentanyl, cocaine, heroin, and methamphetamine, pharmaceutical drugs, for example, alprazolam, ketamine, and oxycodone, smokeless powders, and/or gunshot residue.

Figure 2:
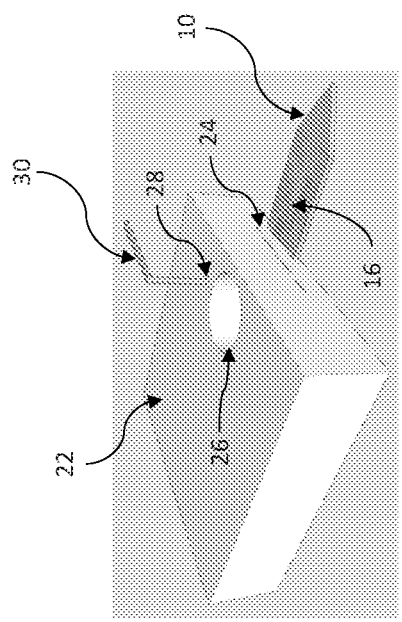
FIG. 2 shows a schematic view of an embodiment of a holder used for testing PSA coated substrate via paper spray mass spectrometry of the present disclosure.

With reference to FIG. 2, a holder or cartridge 20 used for holding PSA coated substrates 10 with contaminates and/or other particles sampled from the contacted surface for being analyzed via paper spray mass spectrometry (PSMS) is shown. Holder 20 generally includes a body 22 having a first opening 24 and a second opening or solvent well 26, wherein first opening 24 is configured to receive PSA coated substrate 10 and second opening 26 is configured to provide space for a solvent to be applied to PSA coating substrate 10. In various embodiments, the solvent may be added to a rear of PSA coating substrate 10. Holder 20 further includes a third opening 28 configured to receive a wire 30 for providing a high voltage to produce ions during the PSMS analysis.

Figure 3:
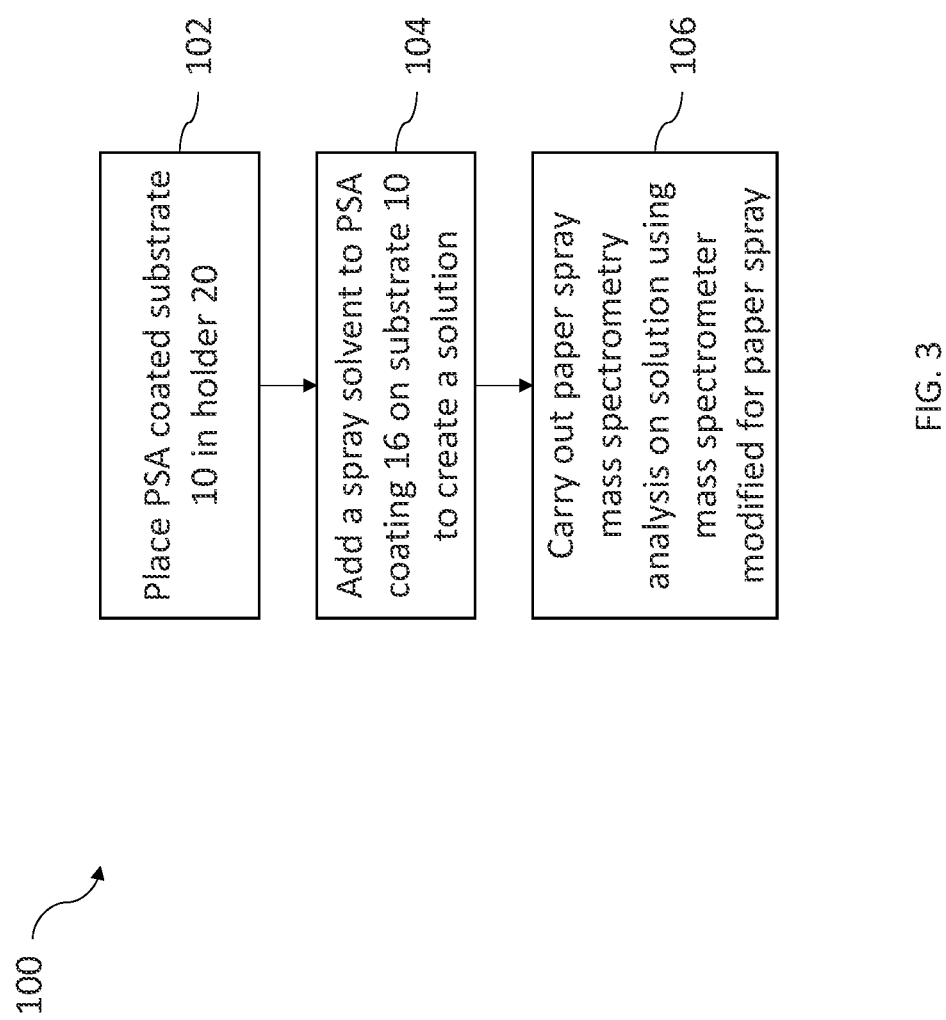
FIG. 3 shows a diagram of a method for analyzing a sample collected using a PSA coated substrate.

Referring now to FIG. 3, a first embodiment of a method 100 for analyzing a sample collected via PSA coated substrate 10 will be described. First, in step 102, PSA coated substrate 10 containing a sample from a surface is provided to holder 20. In various embodiments, PSA coated substrate 10 is provided with body 12 inserted into first opening 24 of holder 20 with PSA coating 16 of body 12 facing upward. Next, in step 104, an amount of a spray solvent, for example 65 µL, is added dropwise to PSA coating 16, over a period of time, for example, approximately 10-15 seconds, and the spray solvent is allowed to wick to tip 14 of PSA coated substrate 10. In various embodiments, the spray solvent may be added through second opening 24 and/or the spray solvent may include organic solvents such as acetonitrile, methanol, isopropanol, or chloroform which may or may not be mixed with additives such as formic acid, acetic acid, or ammonium acetate, or other suitable spray solvents. Finally, in step 106, PSMS analysis is carried out on a mass spectrometer modified for paper spray. With various mass spectrometers, specifically portable mass spectrometers, various modifications may be needed for paper spray mass spectrometry to be carried out. For instance, a paper spray apparatus may be added to a portable mass spectrometer in front of the capillary tube.

During the PSMS analysis, the scan mass range is typically between 50-500 m/z, the capillary temperature is between approximately 250° C. and 275° C., and the spray voltage is between approximately +3.5 kV to +4.0 kV. The scan mass range, the capillary temperature, and the spray voltage typically vary depending on the type of mass spectrometer used. For instance, if the mass spectrometer is a benchtop piece of equipment such as Thermo ORBITRAP ELITE (Thermo Scientific, Inc., San Jose, CA, USA) or a Thermo LTQ XL linear ion trap mass spectrometer (Thermo Scientific, Inc., San Jose, CA, USA), for example, the spray voltage is approximately +3.5 kV, the scan mass range is approximately 80-500 m/z, and the capillary temperature is approximately 275° C. However, if the mass spectrometer is a portable unit, such as Bayspec PORTABILITY (BaySpec, Inc., San Jose, CA, USA), the spray voltage is +4.0 kV, the scan mass range is 50-500 m/z, and the capillary temperature is 250° C. Regardless of the mass spectrometer used, limits of detection (LODs) for acetyl fentanyl, alprazolam, cocaine, heroin, ketamine, methamphetamine, and oxycodone when using PSA coated substrates 10 with paper mass spectrometry are in the sub-nanogram level.

One advantage of using pressure sensitive adhesive (PSA) coated substrate 10 is that particles remain intact after collection. This opens of the possibility of analyzing the particles via other methods prior to or subsequent to performing PSMS analysis. For example, inorganic gunshot residue particles may be analyzed using scanning electron microscopy/energy dispersive X-ray spectroscopy (SEM/EDS) prior to performing PSMS analysis on the same substrate 10 since SEM/EDS is nondestructive. Modifications to PSA coated substrate 10 may even be implemented to better enable SEM/EDS analysis. Another example includes combining PSMS analysis with additional confirmation by gas chromatography (GC)-MS or liquid chromatograph (LC)-MS. This can be done by extracting the same PSA coated substrate 10 used for PSMS since it is known that significant amounts of particles are left behind on substrate 10 after PSMS analysis. In other various embodiments, PSA coated substrate 10 could be divided once the particles are collected, with a portion being saved so additional testing can be ran or the collected particles can be reanalyzed for confirmatory purposes.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued. No claim element herein is to be construed under the provisions of 35 U.S.C. 112(f) unless the element is expressly recited using the phrase "means for."

What is claimed:

1. A method for analyzing a sample collected from a surface, the method comprising:
    providing a substrate having a pressure sensitive adhesive layer containing the sample;
    adding a spray solvent to the sample-containing pressure sensitive adhesive layer; and
    analyzing the sample contained in the pressure sensitive adhesive layer and the spray solvent using paper spray mass spectrometry.

2. The method of claim 1, wherein the sample is analyzed using a portable paper spray mass spectrometer.

3. The method of claim 1, wherein the pressure sensitive adhesive layer includes at least one acrylic-based elastomer.

4. The method of claim 3, wherein the pressure sensitive adhesive layer further includes at least one tackifier.

5. The method of claim 1, wherein the substrate includes a body and a tip, the pressure sensitive adhesive layer being adhered to the body.

6. The method of claim 5 further comprising placing at least a portion of the substrate in a holder prior to adding the spray solvent to the sample-containing pressure sensitive adhesive layer.

7. The method of claim 6, wherein the spray solvent is added to the sample-containing pressure sensitive adhesive layer through an opening in the holder.

8. The method of claim 1, wherein the substrate is formed of paper.

9. A sample collecting substrate comprising:
    a body;
    a tip coupled to the body; and
    a pressure sensitive adhesive layer adhered to at least a portion of the body, wherein the sample collecting substrate is configured to be analyzed via spray paper mass spectrometry.

10. The sample collecting substrate of claim 9, wherein the pressure sensitive adhesive layer includes at least one acrylic-based elastomer.

11. The sample collecting substrate of claim 10, wherein the pressure sensitive adhesive layer further includes at least one tackifier.

12. The sample collecting substrate of claim 9, wherein the tip is triangular shaped.

13. A method for analyzing a sample, the method comprising:
    collecting the sample by contacting a pressure sensitive adhesive layer with a surface containing the sample;
    adding a spray solvent to the pressure sensitive adhesive layer containing the collected sample; and
    analyzing the sample contained in the pressure sensitive adhesive layer and the spray solvent using paper spray mass spectrometry.

14. The method of claim 13, wherein the pressure sensitive layer is provided in the form of a pressure sensitive adhesive coating on a body of a substrate,
    and wherein collecting the sample comprises contacting the pressure sensitive coating with the surface containing the sample.

15. The method of claim 14, wherein the substrate includes a tip extending from the body,
and wherein collecting the sample comprises holding the tip of the substrate and contacting the pressure sensitive coating with the surface containing the sample.

16. The method of claim 14, further comprising placing at least a portion of the substrate in a holder prior to adding the spray solvent to the pressure sensitive adhesive layer containing the collected sample.

17. The method of claim 14, wherein the substrate is formed of paper.

18. The method of claim 13, wherein the sample is analyzed using a portable paper spray mass spectrometer.

19. The method of claim 13, wherein the pressure sensitive adhesive layer includes at least one acrylic-based elastomer.

20. The method of claim 13, wherein the pressure sensitive adhesive layer further includes at least one tackifier.

* * * * *